(12) United States Patent
Suzuki et al.

(10) Patent No.: US 8,033,743 B2
(45) Date of Patent: Oct. 11, 2011

(54) SLIDING MECHANISM OF LENS BARRIER, LENS BARRIER, AND CAMERA

(75) Inventors: Tatsuya Suzuki, Tokyo (JP); Toshimasa Akagi, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/817,314

(22) PCT Filed: Apr. 20, 2007

(86) PCT No.: PCT/JP2007/059134
§ 371 (c)(1),
(2), (4) Date: Jun. 23, 2009

(87) PCT Pub. No.: WO2007/126035
PCT Pub. Date: Nov. 8, 2007

(65) Prior Publication Data
US 2009/0297138 A1 Dec. 3, 2009

(30) Foreign Application Priority Data

Apr. 28, 2006 (JP) .................................. 2006-124993
Apr. 28, 2006 (JP) .................................. 2006-124994

(51) Int. Cl.
*G03B 17/00* (2006.01)
(52) U.S. Cl. ...................................................... 396/448
(58) Field of Classification Search .................... 396/448
See application file for complete search history.

(56) References Cited

U.S. PATENT DOCUMENTS 5,608,478 A * 3/1997 Kamoda ....................... 396/503

(Continued)

FOREIGN PATENT DOCUMENTS

JP        61107226 A     5/1986

(Continued)

OTHER PUBLICATIONS

Japanese language office action and its English language translation for corresponding Japanese application 2006124993.

(Continued)

*Primary Examiner* — W. B. Perkey
*Assistant Examiner* — Bret Adams
(74) *Attorney, Agent, or Firm* — Hogan Lovells US LLP (57) ABSTRACT

A sliding mechanism of a lens barrier, a lens barrier, and a camera have a simplified structure and can be readily downsized. An imaging apparatus has an imaging lens which focuses light to form an image. The lens barrier serves to cover the imaging lens from outside and is mounted on a main body of the imaging apparatus. The sliding mechanism of the lens barrier includes plural cam grooves and plural engaging members. The plural cam grooves are formed on a surface, which faces the main body of the imaging apparatus, of the lens barrier. The plural cam grooves have substantially parallel trajectories. The plural engaging members are arranged in the main body of the imaging apparatus and contact with the bottom portions of the plural cam grooves at least at three positions. The plural engaging members guide the lens barrier along the sliding direction. The lens barrier further includes an inner barrier and an outer barrier. The inner barrier is attached to the main body of the imaging apparatus and is slidable along a predetermined direction. The outer barrier is detachably attached to a surface, which is different from the surface attached to the main body of the imaging apparatus, of the inner barrier. The outer barrier has a surface area at least larger than the imaging lens.

6 Claims, 10 Drawing Sheets

U.S. PATENT DOCUMENTS

| | | | |
|---|---|---|---|
| 5,708,891 A | 1/1998 | Ando et al. | |
| 5,913,089 A * | 6/1999 | Ebe | 396/448 |
| 6,637,953 B2 * | 10/2003 | Nakanishi et al. | 396/448 |
| 6,748,168 B2 * | 6/2004 | Nishiwaki et al. | 396/176 |
| 6,796,727 B2 * | 9/2004 | Tanabe | 396/448 |
| 7,654,406 B2 | 2/2010 | Yanagisawa | |
| 2003/0142974 A1 * | 7/2003 | Tanabe | 396/448 |
| 2004/0190892 A1 * | 9/2004 | Yamane | 396/448 |

FOREIGN PATENT DOCUMENTS

| | | |
|---|---|---|
| JP | 08-006114 | 1/1996 |
| JP | 08029834 A | 2/1996 |
| JP | 10-068983 | 3/1998 |
| JP | 2000155355 A | 6/2000 |
| JP | 2000284343 A | 10/2000 |
| JP | 2001-290196 | 10/2001 |
| JP | 2003233103 A | 8/2003 |
| JP | 2003302670 A | 10/2003 |
| JP | 2004126425 A | 4/2004 |
| JP | 2005115109 A | 4/2005 |

OTHER PUBLICATIONS

Japanese language office action and its English language translation for corresponding Japanese application 2006124994.

International Search Report for corresponding PCT application PCT/JP2007/059134.

* cited by examiner

SLIDING MECHANISM OF LENS BARRIER, LENS BARRIER, AND CAMERA

CROSS-REFERENCE TO THE RELATED APPLICATIONS

This application is a national stage of international application No. PCT/JP2007/059134 filed Apr. 20, 2007, which also claims benefit of priority under 35U.S.C. §119 to Japanese Patent Application Nos. 2006-124993 and 2006-124994 both filed on Apr. 28, 2006, the entire contents of which are incorporated by reference.

TECHNICAL FIELD

The present invention relates to a sliding mechanism of a lens barrier, which covers an imaging lens of an imaging apparatus, a lens barrier, and a camera.

BACKGROUND ART

The imaging apparatus such as a camera has an imaging lens to pick up images. To protect the imaging lens from outside while the imaging apparatus is not used for shooting, a lens barrier is sometimes arranged on the surface of the main body of the imaging apparatus so as to cover the imaging lens. The lens barrier is slidable in a predetermined direction on the surface.

For example, according to the technique described in Japanese Patent Application Laid-Open No. H8-6114, the sliding mechanism of the lens barrier is realized with a rack and pinion so as to minimize the wobbling of the lens barrier and generation of friction between the lens barrier and other member(s) which may occur while the lens barrier slides.

Further, according to the technique described in Japanese Patent Application Laid-Open No. 2001-290196, a guide rail and a barrier holder are provided. The guide rail is provided on a back side of the lens barrier, and has a larger curvature than the curvature of an outer surface of the camera. The barrier holder holds the lens barrier in such a manner that the lens barrier can slide along the guide rail.

Further, Japanese Patent Application Laid-Open No. H10-68983 describes a lens barrier formed from two elements. A camera described in this document includes a barrier which is slidable in a lateral direction with respect to a main camera body, a sub barrier which slides in accordance with the sliding movement of the main barrier, and an opening mechanism which rotates and retracts the sub barrier toward the side of the main barrier when the main barrier slides in an open direction. When the lens barrier is in a close position, the main barrier and the sub barrier cover a lens barrel arranged at the front of the main camera body.

DISCLOSURE OF INVENTION

The sliding mechanisms according to the conventional techniques as described above, however, have a complicated structure. So if the lens barrier is to be downsized, a portion of the sliding mechanism must be inevitably exposed outside. Therefore, the downsizing of the lens barrier is difficult to realize with the conventional sliding mechanism without the sliding mechanism being exposed outside.

In view of the foregoing, an object of the present invention is to provide a sliding mechanism, which has a simplified structure and can be readily downsized, for a lens barrier, and a lens barrier and a camera provided with such a sliding mechanism.

A sliding mechanism of a lens barrier according to one aspect of the present invention slides the lens barrier relative to a main body of an imaging apparatus which includes an imaging lens for focusing light to form an image and the lens barrier to cover the imaging lens from outside. The sliding mechanism includes plural cam grooves which are formed on a surface facing the main body of the imaging apparatus among plural surfaces of the lens barrier, and which have substantially parallel trajectories, and plural engaging members which are provided to the main body of the imaging apparatus, which are brought into contact with bottom portions of the plural cam grooves at least at three positions, and which guide the lens barrier in a sliding direction.

In the sliding mechanism, the plural engaging members may be in contact with the bottom portions of the plural cam grooves at least at three positions, a contact portion at each position being a line segment extending in a widthwise direction which is substantially perpendicular to an extending direction of the cam grooves.

Here, the line segment may include a thin strip-like shape that has a width smaller than the length of the line segment.

The sliding mechanism may further include connecting members which connect the plural engaging members with each other, an elastic member which is placed between the connecting members and the plural engaging members, which is fixed to the lens barrier, and which pushes the lens barrier against the main body of the imaging apparatus.

In the sliding mechanism, the lens barrier and the plural engaging members may be configured so that their positions can be gauged.

In the sliding mechanism, the lens barrier may include an inner barrier on which the plural cam grooves are formed, and an outer barrier which is attached to a surface of the inner barrier, the surface being different from the surface on which the plural cam grooves are formed.

A lens barrier according to another aspect of the present invention is provided in an imaging apparatus having an imaging lens to focus light to form an image, and covers the imaging lens from outside. The lens barrier includes an inner barrier which is attached to a main body of the imaging apparatus and is slidable in a predetermined direction, and an outer barrier which is detachably attached to a surface of the inner barrier and which has a surface area at least larger than the imaging lens, the surface being different from the surface attached to the main body of the imaging apparatus.

In the lens barrier, the inner barrier may include plural cam grooves which are formed on a surface facing the main body of the imaging apparatus, which have substantially parallel trajectories, and which guide a sliding movement of the lens barrier.

A camera according to still another aspect of the present invention includes the sliding mechanism of the lens barrier according to the present invention.

A camera according to still another aspect of the present invention includes the lens barrier according to the present invention.

The sliding mechanism of the lens barrier, the lens barrier, and the camera according to the present invention have a simplified structure and can be readily downsized.

BEST MODE(S) FOR CARRYING OUT THE INVENTION

An exemplary embodiment of the present invention (hereinafter simply referred to as "embodiment") will be described in detail below with reference to the accompanying drawings. A camera according to the embodiment of the present invention is a digital camera which focuses light to form an image through an imaging lens, performs photoelectric conversion of the focused light to acquire electric signals, and performs a predetermined imaging process on the acquired electric signals to generate image data.

Figure 1:
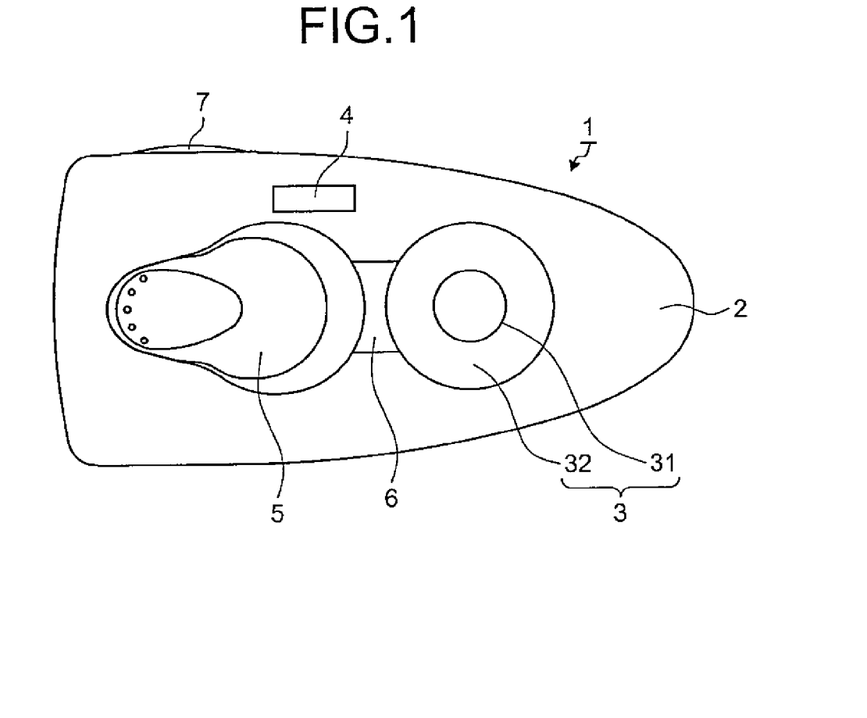
FIG. 1 is a front view of a camera (e.g. digital camera) with an imaging lens exposed according to an embodiment of the present invention.
Figure 2:
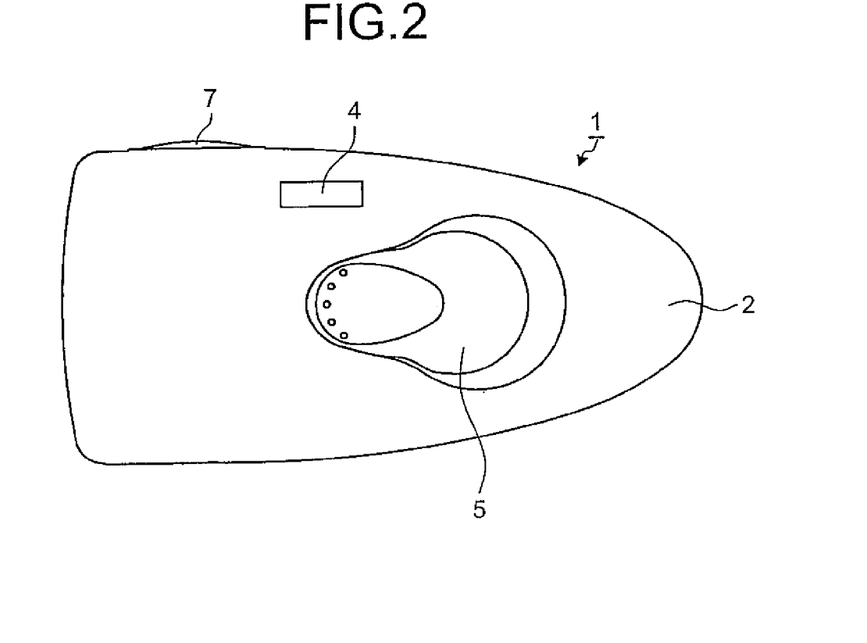
FIG. 2 is a front view of the camera (e.g. digital camera) with the imaging lens covered according to the embodiment of the present invention.

FIGS. 1 and 2 are views schematically showing an appearance of the digital camera according to the embodiment. Specifically, FIG. 1 shows a front side of the digital camera. The front side is a side facing a subject during shooting, and an imaging lens is exposed in FIG. 1. FIG. 2 shows the front side of the digital camera with the imaging lens covered. A digital camera 1 shown in FIGS. 1 and 2 includes a casing-like jacket member 2, and electronic members and optical members which are housed inside the jacket member 2 and perform various functions of the digital camera 1.

Part of members mentioned above is arranged to be exposed on the jacket member 2. Elements exposed on the front side of the jacket member 2 of the digital camera 1 shown in FIGS. 1 and 2 are: an imaging unit 3 including an imaging lens 31 which focuses light to form an image and a lens barrel 32 which holds the imaging lens 31; a flashlight 4 which produces electronic flashes of light; a lens barrier 5 which is attached to the jacket member 2 so as to slide in a direction substantially parallel to the longitudinal direction of the jacket member 2; and a holding member 6 which is fixed to the jacket member 2 to hold a sliding mechanism (described later) including the lens barrier 5 itself. On upper side surface of the digital camera 1 shown in FIG. 1, a shutter button 7 is arranged.

Figure 3:
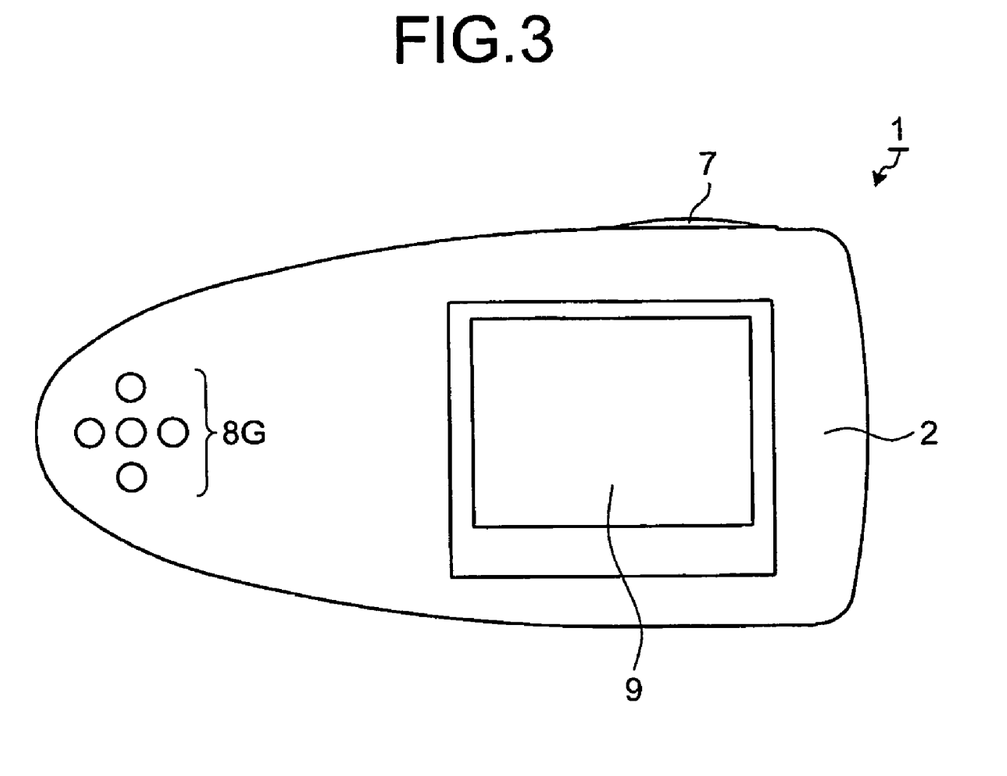
FIG. 3 is a back view of the camera (e.g. digital camera) according to the embodiment of the present invention.

The structure of the digital camera 1 will be described further. FIG. 3 shows a structure on a back side of the digital camera 1 facing a photographer during shooting. On the back side of the digital camera 1 as shown in FIG. 3, a group of operation buttons 8G and a display 9 are provided. Operation signals and/or information concerning the shooting are input by the group of operation buttons 8G. The display 9 is realized as a liquid crystal display, for example, and displays information such as an image(s) formed by the imaging lens 31 and an image(s) acquired through shooting.

In the digital camera 1, electronic members (not shown) and optical members (not shown) are housed to perform various functions. Specifically, the housed elements include, for example: a control circuit configured with a CPU or the like to control the drive of the digital camera 1; a solid-state imaging sensor such as a charge-coupled device (CCD) and a complementary metal oxide semiconductor (CMOS) provided to perform photoelectric conversion of the image formed by the imaging lens 31; a flash memory which stores image information and various programs; a microphone and a speaker which perform input and output of sounds, respectively; and a driving circuit which drives each functioning member under the control of the control circuit. The digital camera 1 further includes a connection interface for a USB terminal, a DC input terminal, and the like. Further, the digital camera 1 may be configured in such a manner that a secondary storage medium such as a memory card can be attached thereto (not shown).

Figure 4:
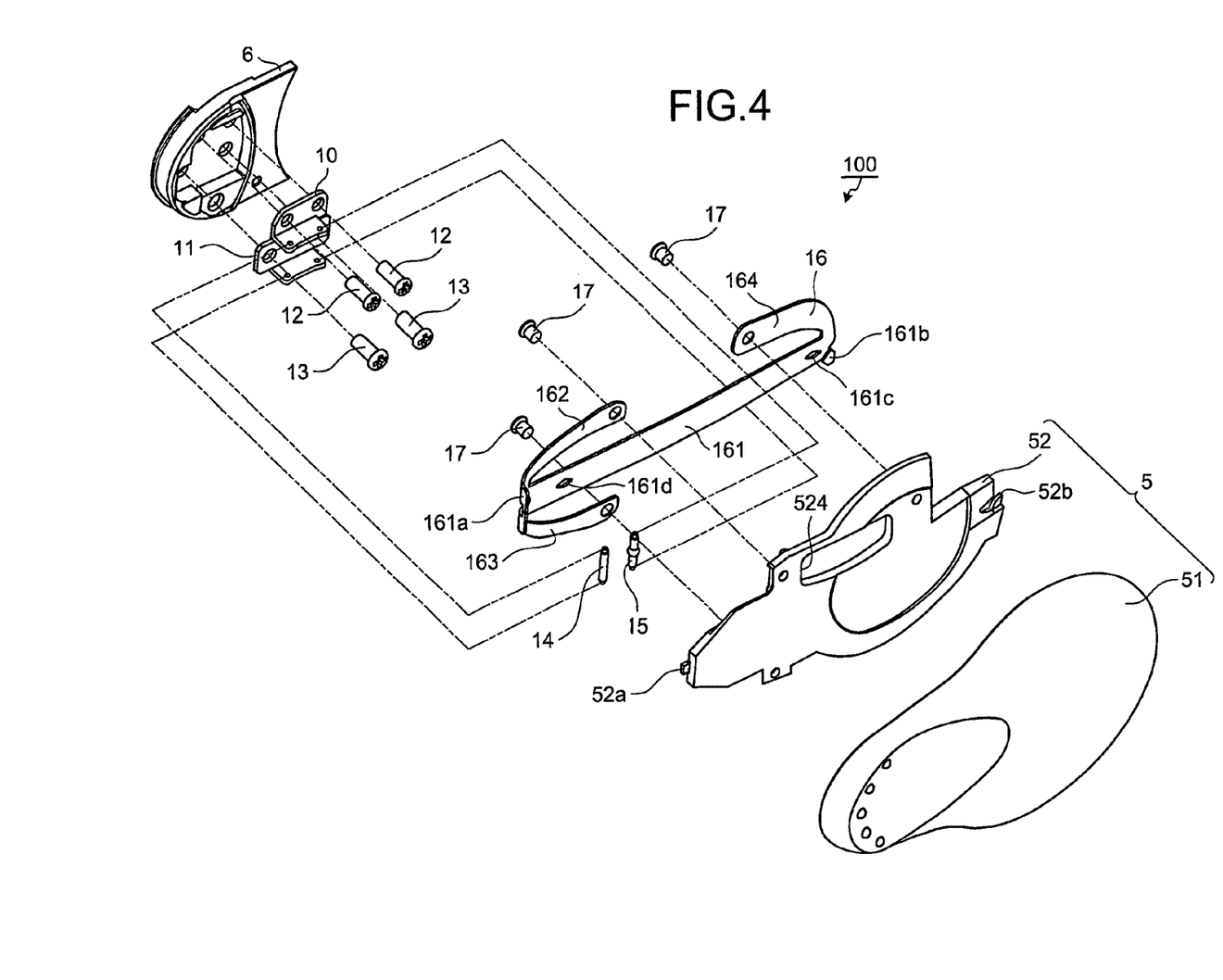
FIG. 4 is an exploded perspective view of a sliding mechanism of a lens barrier according to the embodiment of the present invention.

The sliding mechanism of the lens barrier according to the embodiment will be described. FIG. 4 is an exploded perspective view of a sliding mechanism of the lens barrier according to the embodiment (hereinafter simply referred to as "sliding mechanism"). The lens barrier 5 in a sliding mechanism 100 shown in FIG. 4 includes an outer barrier 51 and an inner barrier 52. The inner barrier 52 has a surface area smaller than the outer barrier 51, and is concealed beneath the outer barrier 51 when viewed from outside (see FIG. 1, for example). Therefore, even when the inner barrier 52 has to be ill-shaped due to the form of the jacket member 2, the outer barrier 51 can make the inner barrier 52 invisible from the outside, whereby a degree of freedom in designing the digital camera 1 can be increased. Thus, it is possible to design a digital camera with a unique shape which is conventionally mechanically impossible.

The outer barrier 51 may be detachable from the inner barrier 52. For example, when the inner barrier 52 is made of magnetic metal and a magnet is attached to an inner surface (i.e., a surface which is brought into contact with the inner barrier 52 when the outer barrier 51 is attached to the inner barrier 52) of the outer barrier 51, the outer barrier 51 can be made detachable from the inner barrier 52. Alternatively, the outer barrier 51 may be screwed onto the inner barrier 52 from the outside. Still alternatively, the outer barrier 51 and the inner barrier 52 may be configured in such a manner that the outer barrier 51 can be fitted to the inner barrier 52 by sliding against the inner barrier 52 from upside or downside. When the outer barrier 51 is detachable from the inner barrier 52, the user can change the outer barrier 51 to another outer barrier with a shape and design which is preferable depending on the mood.

Figure 5:
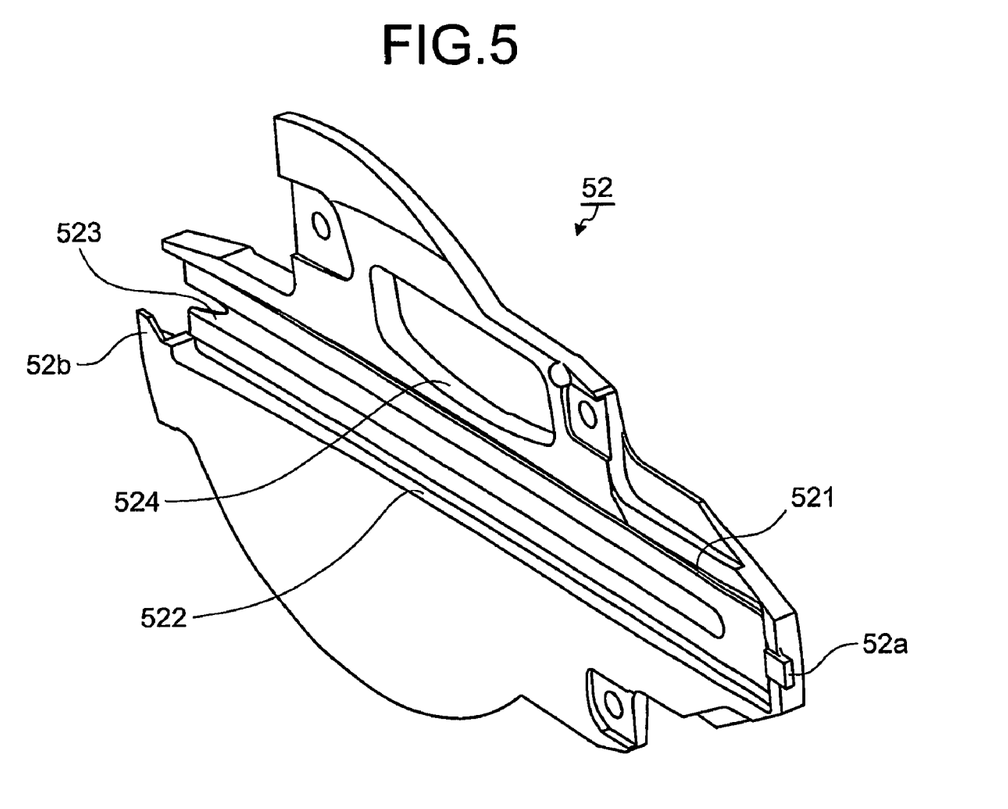
FIG. 5 is a perspective view of an inner barrier.

FIG. 5 is a perspective view of the inner barrier 52 showing a surface opposite to the surface shown in FIG. 4 (i.e., a surface which faces the main body when the inner barrier 52 is attached to the main body). On the surface of the inner barrier 52 shown in FIG. 5, two rail-like cam grooves 521 and 522 are provided. The cam grooves 521 and 522 are substantially parallel with each other and guide the sliding movement of the lens barrier 5. The cam groove 521 receives an end of an engaging member 10, whereas the cam groove 522 receives an end of an engaging member 11. A bottom surface of each of the cam grooves 521 and 522 forms a gentle curve along an extending direction of each cam groove so that the lens barrier 5 can smoothly move along the surface of the jacket member 2.

Since the cam grooves 521 and 522 which function as a rail along which the lens barrier 5 slides are formed on the inner surface of the inner barrier 52, the cam grooves 521 and 522, which are parts of the sliding mechanism, are not exposed outside the digital camera 1 even when the lens barrier 5 is downsized, and so the digital camera 1 looks good cosmetically.

Figure 6:
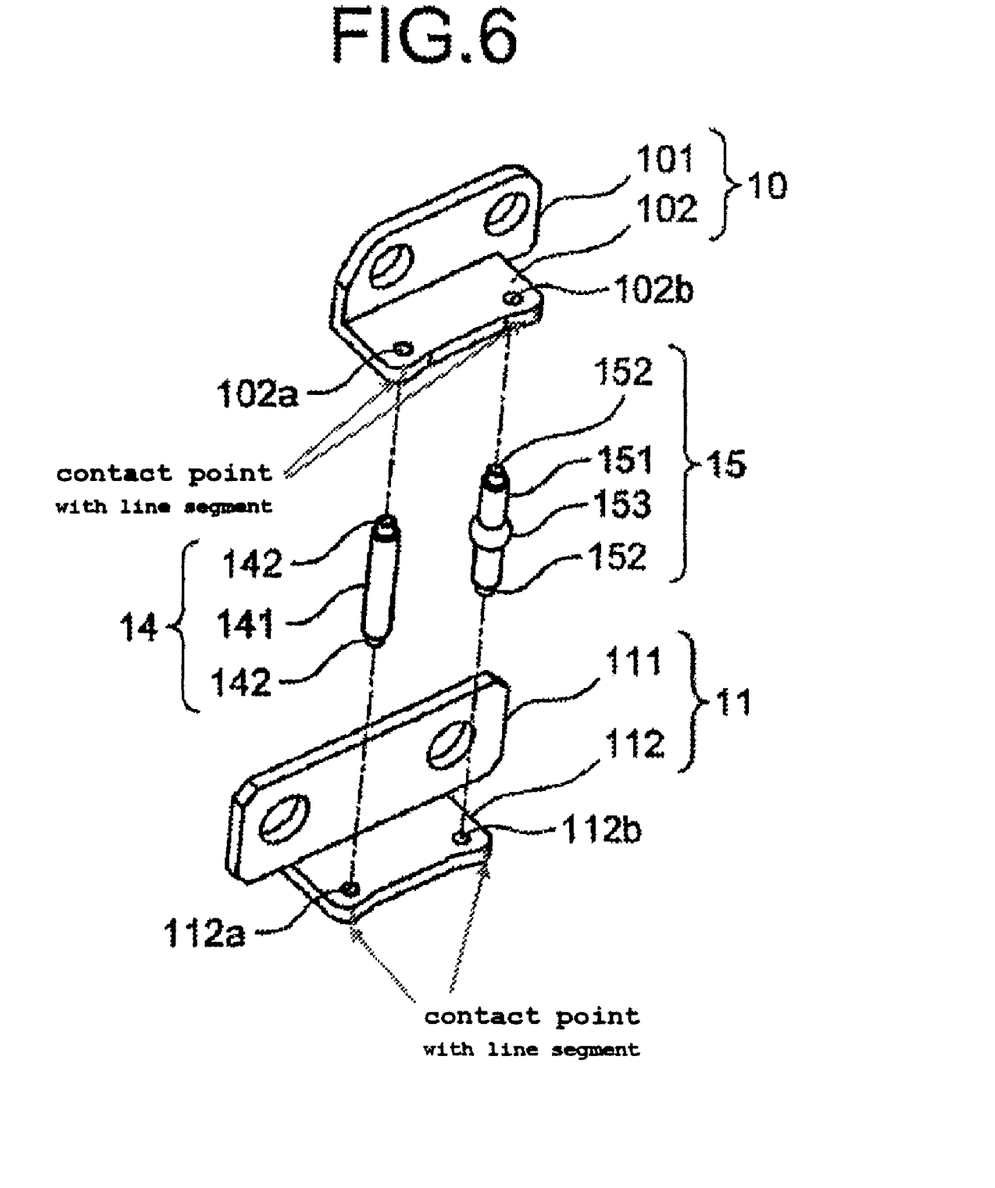
FIG. 6 is an exploded view of engaging members.

FIG. 6 shows a structure of the engaging members 10 and 11 described above. Of which, the engaging member 10 has a base portion 101 which is fixed to the holding member 6 with a screw 12, and a flat plate-like contact portion 102 which is projected in a direction perpendicular to an extending direction of the base portion 101 and which is brought into contact with the cam groove 521. Two holes 102a and 102b penetrate a rim portion of the contact portion 102. The holes 102a and 102b serve to hold the ends of two rod-like-rollers 14 and 15 (whose structure will be described later in detail), respectively. The rollers 14 and 15 are connecting members that connect the engaging members 10 and 11 with each other.

The engaging member 11 has a base portion 111 which is fixed to the holding member 6 with a screw 13, and a flat plate-like contact portion 112 which is projected in a direction perpendicular to an extending direction of the base portion 111 and which is brought into contact with the cam groove 522. Two holes 112a and 112b penetrate a rim portion of the contact portion 112 and hold another ends of the rollers 14 and 15, respectively. A distance between the centers of holes 112a and 112b is the same as a distance between the centers of holes 102a and 102b.

Each of the contact portions 102 and 112 is substantially rectangular, and a long side at the proximal end is depressed at the center of the side and forms a curved protrusion at two ends of the side (see FIG. 6). When the engaging members 10 and 11 are fixed to the holding member 6, tip ends of these four protrusions of the contact portion 102 and the contact portion 112 are placed on one plane. The contact portion 102 of the engaging member 10 contacts with the bottom surface of the cam groove 521 at two positions, and the contact portion at each position is a line segment extending in a widthwise direction which is substantially perpendicular to the extending direction of the cam groove 521. On the other hand, the contact portion 112 of the engaging member 11 contacts with the bottom surface of the cam groove 522 at two positions, and the contact portion at each position is a line segment extending in a widthwise direction which is substantially perpendicular to the extending direction of the cam groove 522. Such structure allows a stable sliding movement of the lens barrier 5 at all times. When the inner barrier 52 in particular in the lens barrier 5 is downsized, the engaging members 10 and 11 can be downsized accordingly, so that a sufficient stroke of the lens barrier 5 can be secured. In the above, the line segment include a thin strip-like shape that has a width smaller than the length of the line segment.

As described above, the contact portion 102 of the engaging member 10 and the contact portion 112 of the engaging member 11 are connected with each other via two rollers 14 and 15. The roller 14 has a column-like thick portion 141, and thin portions 142 which are formed on both ends of the thick portion 141 coaxially with the thick portion 141 and which have a smaller diameter than the thick portion 141. The roller 15 has a column-like thick portion 151, thin portions 152 which are formed on both ends of the thick portion 151 coaxially with the thick portion 151 and which have a smaller diameter than the thick portion 151 and which have the same shape as the thin portion 142, and a spherical portion 153 which bulges like a sphere from the circumferential surface of the thick portion 151.

Two thin portions 142 are inserted into the holes 102a and 112a, respectively, and rotatably and axially supported, whereas two thin portions 152 are inserted into the holes 102b and 112b, respectively, and rotatably and axially supported. When the engaging members 10 and 11 are attached to the inner barrier 52, the spherical portion 153 is guided along a guide groove 523 formed on the inner barrier 52. The guide groove 523 is substantially parallel with the cam grooves 521 and 522 and is formed between the cam grooves 521 and 522.

When the rollers 14 and 15 are attached to the engaging members 10 and 11 to connect the engaging members 10 and 11, a leaf spring 16 is placed between the base portion 111 of the engaging member 11 and the rollers 14 and 15 (see FIG. 4). The leaf spring 16 includes a main body portion 161, and three fastening portions 162, 163, and 164. The main body portion 161 is a belt-like portion with a width slightly narrower than the distance between the contact portion 102 and the contact portion 112 when the engaging members 10 and 11 are connected. Each of the fastening portions 162, 163, and 164 extends from one of the ends of the main body portion 161 and is fastened to the inner barrier 52 with a screw 17. Further, hooks 161a and 161b are formed at the longitudinal ends of the main body portion 161. The hooks 161a and 161b are engaged with protrusions 52a and 52b formed at the ends of the inner barrier 52, respectively.

Further, two click holes 161c and 161d are formed at two end portions of the main body portion 161, respectively. The spherical portion 153 of the roller 15 can be fit into the click holes 161c and 161d. The click holes 161c, 161d, and the spherical portion 153 form together a clicking mechanism which serves to position the lens barrier 5 of the digital camera 1 during shooting (FIG. 1) and non-shooting (FIG. 2).

The main body portion 161 is arched like a bow so that the two ends are slightly farther from the inner barrier 52 than the central portion. When the two ends are hooked to the inner barrier 52 via the hooks 161a and 161b, the inner barrier 52 is pulled back toward the engaging members 10 and 11, whereby the inner barrier 52 is prevented from receding from the jacket member 2. The shape of each of the protrusions 52a, 52b, and the hooks 161a, 161b is merely exemplary.

The sliding mechanism 100 having the above-described structure is assembled in the following manner. First, the engaging member 11 is fixed to the holding member 6 with the screw 13. The main body portion 161 of the leaf spring 16 is arranged on the base portion 111 of the engaging member 11. One of the thin portions 142 and one of the thin portions 152 of the rollers 14 and 15 are inserted into the holes 112a and 112b of the contact portion 112 of the engaging member 11, respectively. Then, another of the thin portions 142 and another of the thin portions 152 are inserted into the holes 102a and 102b of the contact portion 102 of the engaging member 10, respectively. Then, the base portion 101 is temporarily fixed to the holding member 6 with the screw 12. Thereafter, the members are positioned so that the contact portions 102 and 112 are brought into contact with the cam grooves 521 and 522, respectively. The leaf spring 16 is fixed to the inner barrier 52 via the screw 17.

Then, the engaging member 10 which is in a temporarily-fixed state is fixed to the holding member 6 in the following manner. The inner barrier 52 is made to slide until a window portion 524 (see FIGS. 4 and 5) formed in an upper portion of the inner barrier 52 is positioned in normal direction of the base portion 101 of the engaging member 10. The inner barrier 52 is raised so that the lower surface of the contact portion 112 of the engaging member 11 is brought into contact with a side surface of the cam groove 522. While the inner barrier 52 is kept in such a state, the engaging member 10 is raised until the upper surface of the contact portion 102 of the engaging member 10 is brought into contact with a side surface of the cam groove 521. In this state, the screw 12 is fastened tightly, and the engaging members 10 and 11 are properly positioned relative to the inner barrier 52. Thus, the wobbling of the inner barrier 52 relative to the engaging members 10 and 11 is prevented, and at the same time, the falling off of the sliding inner barrier 52 is prevented, whereby the secure sliding movement can be realized.

Since the engaging members 10 and 11 are small members, it is difficult to achieve a high dimensional accuracy based on the design. In view of this, the positions of the engaging member 10 and the inner barrier 52 are gauged as described above according to the embodiment, whereby the wobbling and the falling-off during sliding can be prevented.

Figure 7:
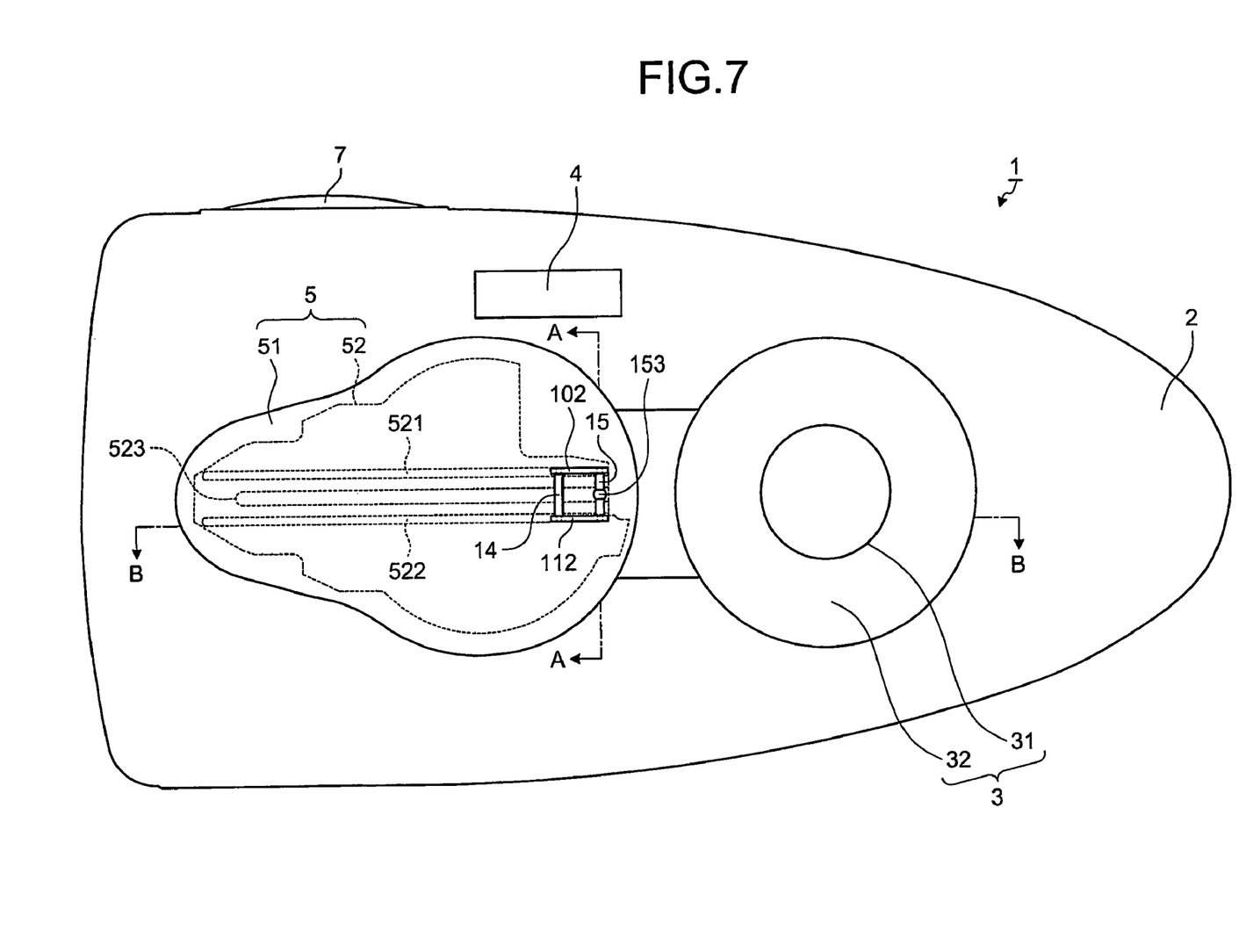
FIG. 7 is a schematic view of a digital camera during shooting, on which the sliding mechanism of the lens barrier according to the embodiment of the present invention is mounted.
Figure 8:
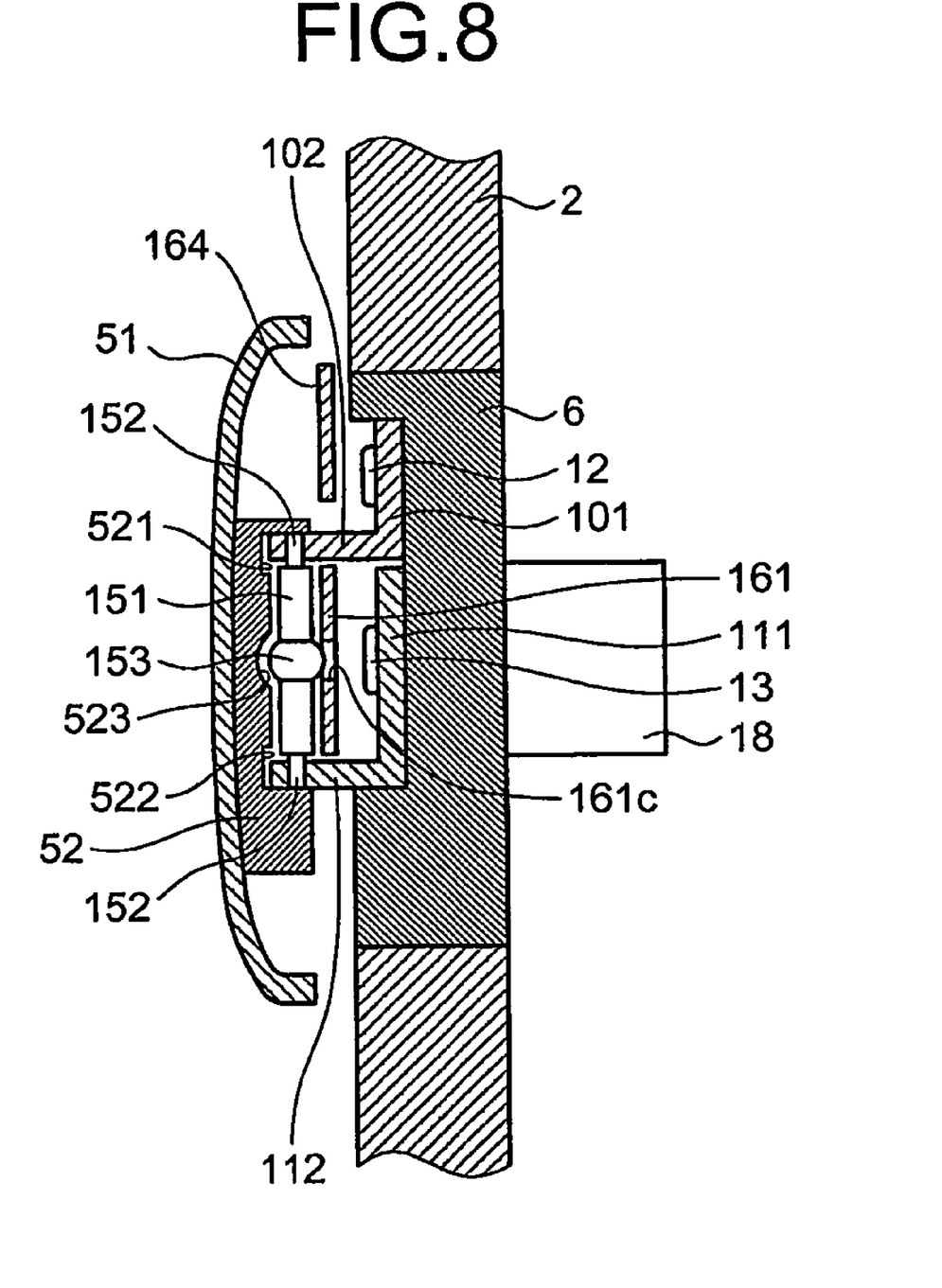
FIG. 8 is a partial sectional view along line A-A of FIG. 7.
Figure 9:
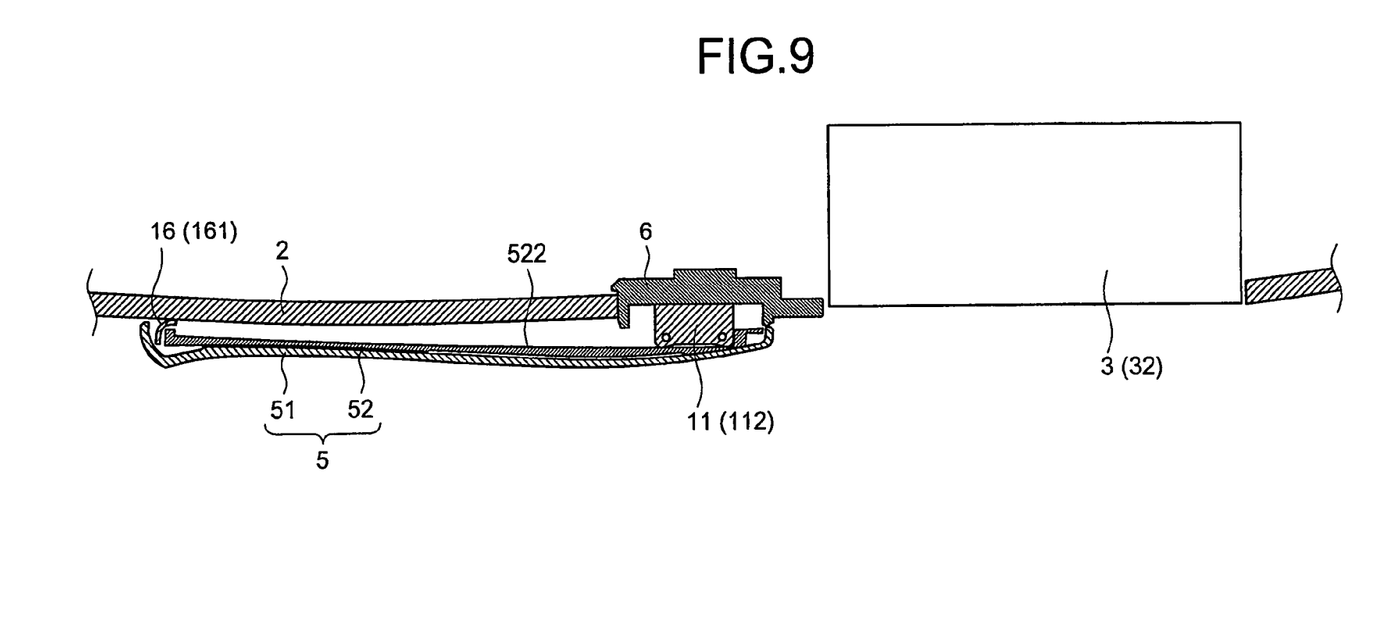
FIG. 9 is a partial sectional view along line B-B of FIG. 7.

FIG. 7 schematically shows the digital camera 1 on which the sliding mechanism 100 is mounted. Specifically, FIG. 7 shows the digital camera 1 during shooting (similarly to FIG. 1). Further, FIG. 8 is a partial sectional view along line A-A of FIG. 7, and shows the spherical portion 153 of the roller 15 fit into the click hole 161c provided in the main body portion 161 of the leaf spring 16. Further, FIG. 9 is a partial sectional view along line B-B of FIG. 7, and shows the contact portion 112 of the engaging member 11 in contact with the bottom portion of the cam groove 522. In FIGS. 8 and 9, only a structure around the lens barrier 5 is shown and inner structure of the digital camera 1, for example is not particularly shown.

As shown in FIGS. 7 to 9, during shooting, the lens barrier 5 is made to slide until the spherical portion 153 of the roller 15 comes to fit into the click hole 161c provided at one end portion of the main body portion 161 of the leaf spring 16 so as to expose the imaging lens 31. In other words, the lens barrier 5 cannot be moved to farther leftward position than the position shown in FIGS. 7 and 9.

FIG. 8 shows the holding member 6 fixed to a frame member 18 which is attached to the inner surface of the jacket member 2 to strengthen the jacket member 2. The embodiment shown in FIG. 8, however, is merely an example. The holding member 6 may be configured so as to be directly fixed to the jacket member 2 rather than fixed to the frame member 18.

Figure 10:
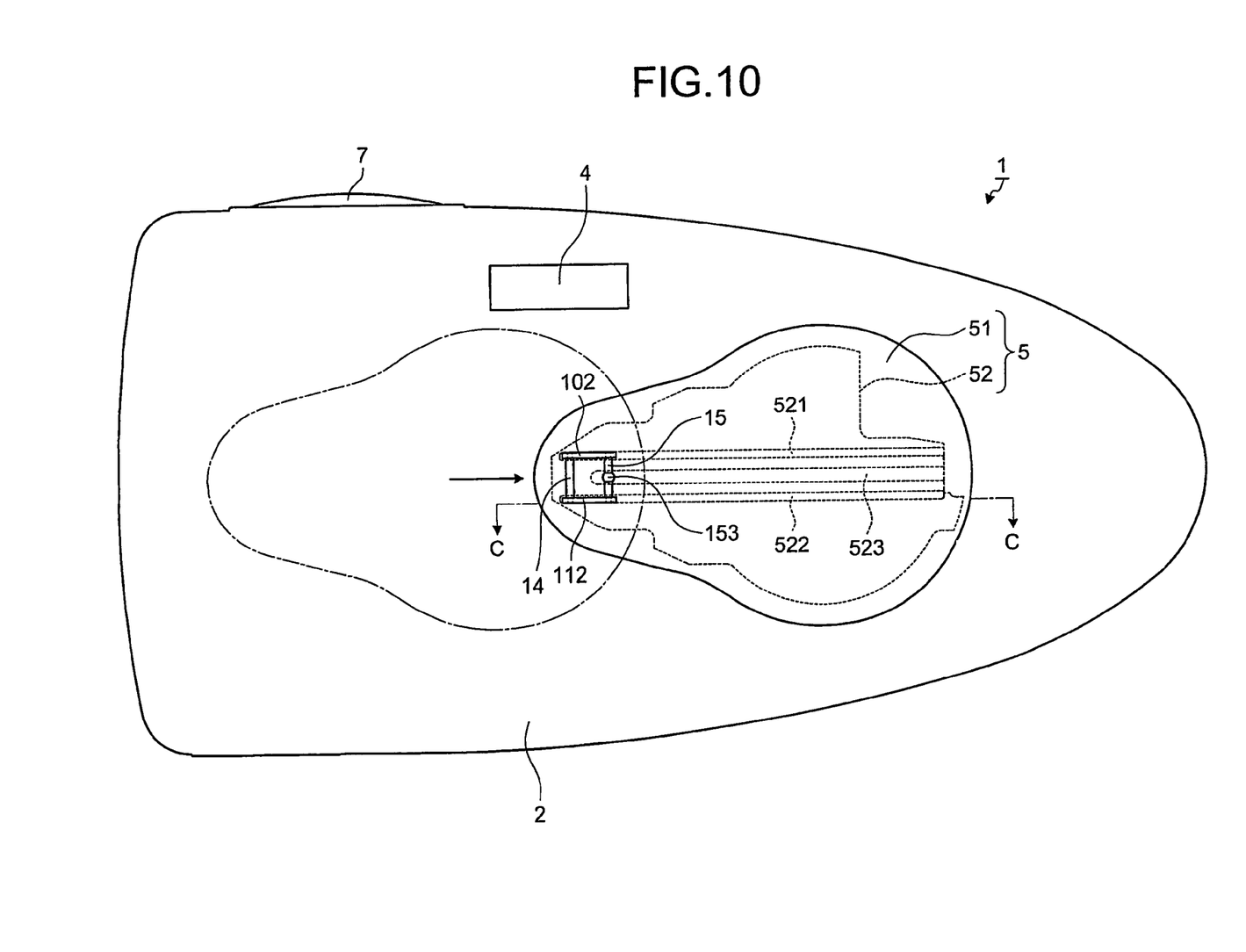
FIG. 10 is a schematic view of the digital camera during non-shooting, on which the sliding mechanism of the lens barrier according to the embodiment of the present invention is mounted.
Figure 11:
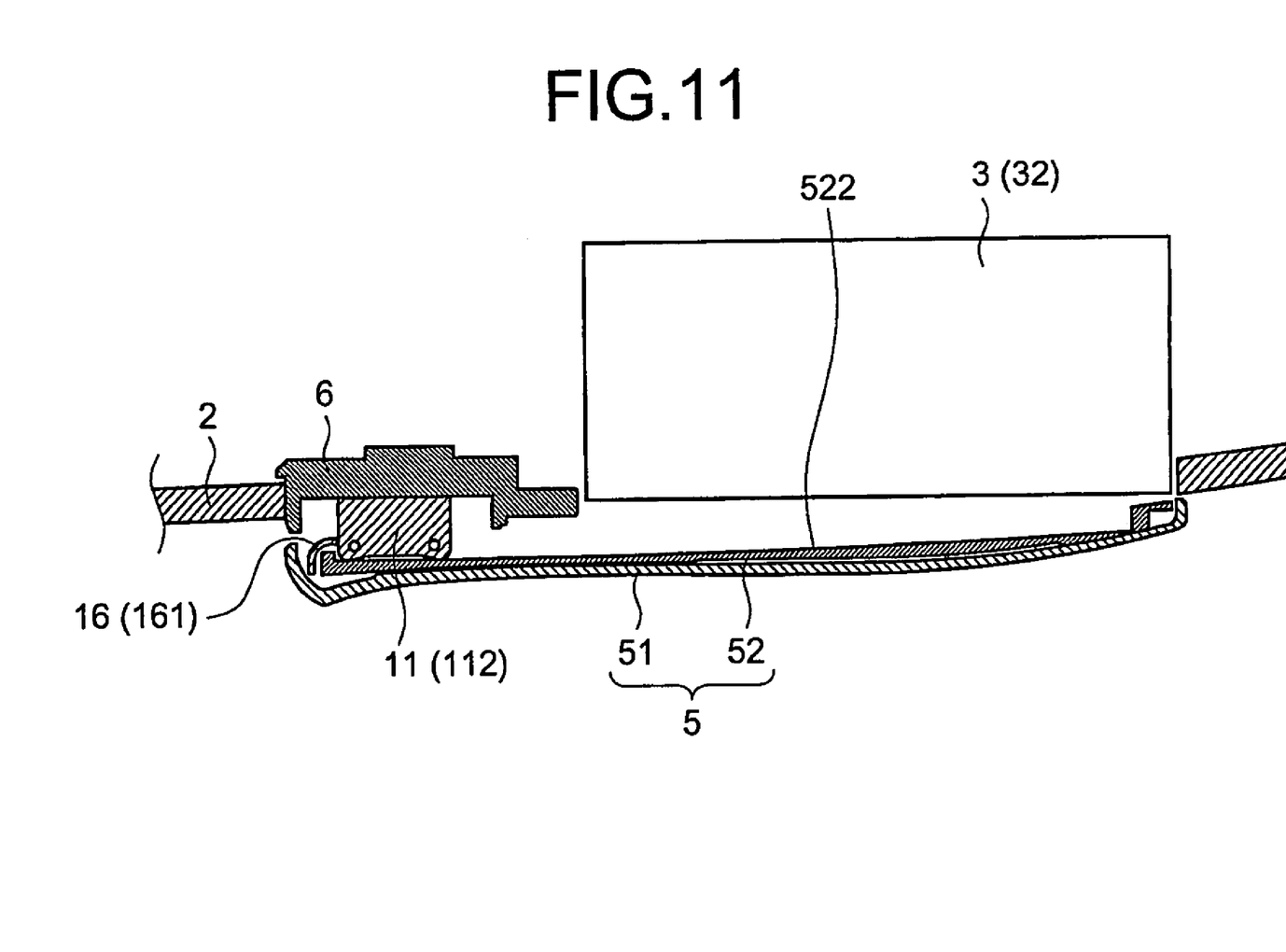
FIG. 11 is a partial sectional view along line C-C of FIG. 10.

FIG. 10 schematically shows the digital camera 1 during non-shooting (the same state as shown in FIG. 2). FIG. 11 is a partial sectional view along line C-C of FIG. 10. In FIG. 11, only a structure around the lens barrier 5 is shown and the inner structure of the digital camera 1, for example, is not particularly shown, similarly to FIG. 9. As shown in FIGS. 10 and 11, while non-shooting, the lens barrier 5 covers the surface of the imaging unit 3, thereby covering the imaging lens 31.

When the lens barrier 5 is needed to move from the state at shooting shown in FIG. 7 to the state at non-shooting shown in FIG. 10, for example, the lens barrier 5 has only to be slid so that the spherical portion 153 of the roller 15 escapes from the click hole 161c and fits into the click hole 161d formed in another end portion of the main body portion 161 of the leaf spring 16.

A manner in which the spherical portion 153 fits into the click hole 161d at non-shooting is the same as the manner in which the spherical portion 153 fits into the click hole 161c as shown in FIG. 8. A manner in which the contact portion 102 of the engaging member 10 contacts with the bottom portion of the cam groove 521 at shooting and non-shooting is the same as the manner in which the contact portion 112 of the engaging member 11 contacts with the bottom portion of the cam groove 522 at shooting (FIG. 9) and at non-shooting (FIG. 11), respectively.

The sliding mechanism of the lens barrier according to the embodiment of the present invention as described above and the camera provided with such a sliding mechanism of the lens barrier include plural cam grooves and plural engaging members. The plural cam grooves are formed on the surface of the lens barrier which covers the imaging lens that focuses light to form an image. The surface faces the main body of the imaging apparatus (camera) on which the lens barrier is mounted. The plural cam grooves have substantially parallel trajectories. The plural engaging members are arranged on the main body of the imaging apparatus, contact with the bottom portions of the plural cam grooves at least at three positions (e.g., four positions in the above-described embodiment), and guide the lens barrier along the sliding direction. Thus, the sliding mechanism of the lens barrier and the camera provided with such a sliding mechanism of the lens barrier according to the embodiment have a simplified structure, and can be readily downsized without the structure being exposed outside.

Further, the lens barrier and the camera provided with such a lens barrier according to the embodiment includes the inner barrier and the outer barrier. The inner barrier is attached to the main body of the imaging apparatus provided with the imaging lens to focus light to form an image, and is slidable along a predetermined direction. The outer barrier is detachably attached to one surface of the inner barrier, i.e., a different surface from the surface attached to the main body of the imaging apparatus. The outer barrier has a surface area at least larger than the imaging lens. Thus, the lens barrier and the camera provided with such a lens barrier according to the embodiment have a simplified structure and can be readily downsized without the structure being exposed outside, whereby a degree of freedom in attachment positions of the lens barrier and the design of the camera body can be increased.

In particular, according to the lens barrier and the camera provided with such a lens barrier according to the embodiment, even when the inner barrier may have a shape which looks bad cosmetically due to the shape of the jacket member, the outer barrier can cover up the inner barrier, whereby the degree of freedom in design of the camera body can be significantly improved.

Further, according to the lens barrier and the camera provided with such a lens barrier according to the embodiment, the outer barrier can be made detachable from the inner barrier. Therefore, the user can choose the outer barrier with the shape and the design which is preferable depending on the mood, and products can be made to have unique design with sense of fun.

The exemplary embodiment of the present invention has been described in detail. The present invention, however, should not be limited to the above-described embodiment. For example, as far as the engaging members and the bottom portions of the cam grooves contact with each other at least at three positions, any configuration may be adopted. For example, when two engaging members is in contact with the bottom portions of the cam grooves, one engaging member may contact the bottom portion of the cam groove at two positions, while the other engaging member may contact the bottom portion of another cam groove at one position so that three contact portions may be arranged on one plane. Further, there can be three or more cam grooves. In this case, the engaging members may be provided to the number of the cam grooves.

Further, in the embodiment, the lens barrier is formed from two elements, i.e., the inner barrier and the outer barrier. The lens barrier, however, may be formed from three or more elements. For example, when the inner barrier is made of non-magnetic metal or plastics, the outer barrier cannot be fixed to the inner barrier with a magnet. It may be possible, however, to provide an intermediate barrier made of magnetic metal fixed to the inner barrier and thereby to make the outer barrier detachable with the use of magnet.

The above description assumes that the present invention is applied to a digital camera with fixed lens barrel. However, the present invention is similarly applicable to a digital camera with retractable lens barrel. In this case, an additional click hole may be formed near the click hole 161c to the center of the leaf spring 16 in the same shape as the click hole 161c. Further, a switching circuit may be provided so that the lens barrel 32 is projected from the surface when the spherical portion 153 of the roller 15 fits into the additional click hole.

Further, the sliding mechanism of lens barrier and the lens barrier according to the present invention are applicable to imaging apparatuses other than the digital camera described above, for example, film cameras and various types of video recorders.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

INDUSTRIAL APPLICABILITY

The present invention can be applied to imaging apparatuses such as cameras and video recorders.

The invention claimed is:

1. A sliding mechanism which slides a lens barrier of an imaging apparatus relative to a main body of the imaging apparatus, the imaging apparatus including an imaging lens for focusing light to form an image and the lens barrier to cover the imaging lens from outside, the sliding mechanism comprising:
a first cam groove and a second cam groove, each formed on a surface facing the main body of the imaging apparatus, and each having a trajectory substantially parallel to that of the other cam groove;
a first engaging member and a second engaging member, each provided to the main body of the imaging apparatus, to guide the lens barrier in a sliding direction, the first engaging member having at least two contact points for contacting the first cam grove, and the second engaging member having at least one contact point for contacting the second cam groove such that said engaging members are in sliding engagement at said contact points with said cam grooves;
a connecting member which connects the first engaging member and the second engaging member; and
an elastic member which is placed between the connecting member and the first and second engaging members and is fixed to the lens barrier, and pushes the lens barrier against the main body of the imaging apparatus.

2. The sliding mechanism according to claim 1, wherein each of the contact points of the first engaging member and the second engaging member has a line segment area extending in a direction which is substantially perpendicular to an extending direction of the corresponding cam groove.

3. A sliding mechanism which slides a lens barrier of an imaging apparatus relative to a main body of the imaging apparatus, the imaging apparatus including an imaging lens for focusing light to form an image and the lens barrier to cover the imaging lens from outside, the sliding mechanism comprising:
a first cam groove and a second cam groove, each formed on a surface facing the main body of the imaging apparatus, and each having a trajectory substantially parallel to that of the other cam groove; and
a first engaging member and a second engaging member, each provided to the main body of the imaging apparatus, to guide the lens barrier in a sliding direction, the first engaging member having at least two contact points for contacting points for contacting the first cam groove, and the second engaging member having at least one contact point for contacting the second cam groove such that said engaging members are in sliding engagement at said contact points with said cam grooves, wherein
the lens barrier includes
an inner barrier on which the first and second cam grooves are formed, and
an outer barrier which is attached to a surface of the inner barrier, the surface being different from a surface on which the first and second cam grooves are formed.

4. A camera comprising
the sliding mechanism of the lens barrier according to claim 1.

5. The sliding mechanism according to claim 3, wherein each of the contact points of the first engaging member and the second engaging member has a line segment area extending in a direction which is substantially perpendicular to an extending direction of the corresponding came groove.

6. A camera comprising
the sliding mechanism of the lens barrier according to claim 3.

* * * * *